United States Patent
Jarvenpaa

(10) Patent No.: US 11,573,418 B2
(45) Date of Patent: Feb. 7, 2023

(54) OPTICAL APPARATUSES AND METHODS

(71) Applicant: Nokia Technologies Oy, Espoo (FI)

(72) Inventor: Toni Johan Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 39 days.

(21) Appl. No.: 17/326,540

(22) Filed: May 21, 2021

(65) Prior Publication Data

US 2021/0373324 A1 Dec. 2, 2021

(30) Foreign Application Priority Data

May 29, 2020 (EP) ..................................... 20177364

(51) Int. Cl.
  *G02B 27/00* (2006.01)
  *G02B 5/18* (2006.01)
  *G02B 27/42* (2006.01)

(52) U.S. Cl.
  CPC ....... *G02B 27/0081* (2013.01); *G02B 5/1819* (2013.01); *G02B 27/4233* (2013.01); *G02B 27/4277* (2013.01)

(58) Field of Classification Search
  CPC .............. G02B 27/0081; G02B 5/1819; G02B 27/4233; G02B 27/4277; G02B 5/1847; G02B 27/0172
  See application file for complete search history.

(56) References Cited

U.S. PATENT DOCUMENTS

2010/0277803 A1* 11/2010 Pockett .................. G03B 21/62
  353/121

OTHER PUBLICATIONS

"inverse, adj. and n." OED Online, Oxford University Press, Jun. 2022, www.oed.com/view/Entry/99001. Accessed Aug. 23, 2022. (Year: 2022).*

* cited by examiner

*Primary Examiner* — Kimberly N. Kakalec
(74) *Attorney, Agent, or Firm* — Harrington & Smith

(57) ABSTRACT

An apparatus including
  a first substrate including a first incoupling diffractive optical element configured to couple light into the first substrate, and a first outcoupling diffractive optical element configured to output, from the first substrate, light that has been coupled into the first substrate; and
  a second substrate including a second incoupling diffractive optical element configured to couple light into the second substrate, and a second outcoupling diffractive optical element configured to output, from the second substrate, light that has been coupled into the second substrate;
  wherein the first and second incoupling diffractive optical elements are substantially inverse of each other and the first and second outcoupling diffractive optical elements are substantially inverse of each other.

19 Claims, 6 Drawing Sheets

OPTICAL APPARATUSES AND METHODS

TECHNOLOGICAL FIELD

Embodiments of the present disclosure relate to optical apparatuses and methods. Some relate to optical apparatuses and methods for expanding an exit pupil.

BACKGROUND

Optical apparatuses, such as exit pupil expanders, are often used in augmented reality and heads-up display systems.

It some circumstances it can be beneficial to improve the efficiency and/or uniformity of such optical apparatuses.

BRIEF SUMMARY

According to various, but not necessarily all, embodiments there is provided examples as claimed in the appended claims.

According to various, but not necessarily all, embodiments there is provided an apparatus comprising:
  a first substrate comprising a first incoupling diffractive optical element configured to couple light into the first substrate, and a first outcoupling diffractive optical element configured to output, from the first substrate, light that has been coupled into the first substrate; and
  a second substrate comprising a second incoupling diffractive optical element configured to couple light into the second substrate, and a second outcoupling diffractive optical element configured to output, from the second substrate, light that has been coupled into the second substrate;
  wherein the first and second incoupling diffractive optical elements are substantially inverse of each other and the first and second outcoupling diffractive optical elements are substantially inverse of each other.

In examples, the first and second substrates are stacked and at least a portion of the first and second substrates overlap.

In examples, the diffractive optical elements are sealed within the stack.

In examples, the second incoupling diffractive optical element is configured to couple into the second substrate light that has passed through the first incoupling diffractive optical element without being coupled into the first substrate.

In examples, the apparatus comprises polarization rotation means and/or wavelength dependent filtering means between the first and second incoupling diffractive optical elements.

In examples, the apparatus comprises a third substrate, the third substrate comprising a third incoupling diffractive optical element configured to couple light into the third substrate, and a third outcoupling diffractive optical element configured to output, from the third substrate, light that has been coupled into the third substrate, wherein:
  the third incoupling diffractive optical element is configured to couple into the third substrate light that has passed through the first incoupling diffractive optical element without being coupled into the first substrate; and
  the diffractive optical elements of the first and second substrates are configured to operate in a first spectral range and the diffractive optical elements of the third substrate are configured to operate in a second, at least partially different, spectral range.

In examples, the apparatus comprises a fourth substrate, the fourth substrate comprising a fourth incoupling diffractive optical element configured to couple light into the fourth substrate, and a fourth outcoupling diffractive optical element configured to output, from the fourth substrate, light that has been coupled into the fourth substrate, wherein:
  the fourth incoupling diffractive optical element is configured to couple into the fourth substrate light that has passed through the first incoupling diffractive optical element without being coupled into the first substrate; and
  the third and fourth incoupling diffractive optical elements are substantially inverse of each other and the third and fourth outcoupling diffractive optical elements are substantially inverse of each other.

In examples, the first, second, third and fourth substrates are stacked and at least a portion of the first, second, third and fourth substrates overlap.

In examples, the first substrate comprises a first intermediate diffractive optical element configured to expand in a first and/or second dimension an exit pupil of light coupled into the first substrate; and
  wherein the second substrate comprises a second intermediate diffractive optical element configured to expand in the first and/or second dimension an exit pupil of light coupled into the second substrate, wherein the first and second dimensions are different and wherein the first and second intermediate diffractive optical elements are substantially inverse of each other.

In examples, at least one of: substrate thickness, substrate shape, substrate materials, diffractive optical element materials and coatings differ between the first and second substrate.

In examples, the outcoupling diffractive optical elements are configured to expand an exit pupil of light coupled into the respective substrates.

According to various, but not necessarily all, embodiments, there is provided a system comprising an apparatus as described herein, a light source configured to provide light to at least the first incoupling diffractive optical element, wherein the apparatus is configured to expand the exit pupil of the light source.

According to various, but not necessarily all, embodiments there is provided an electronic device comprising a system as described herein, and at least one user input device.

According to various, but not necessarily all, embodiments there is provided a method comprising:
  providing a first substrate comprising a first incoupling diffractive optical element configured to couple light into the first substrate, and a first outcoupling diffractive optical element configured to output, from the first substrate, light that has been coupled into the first substrate; and
  providing a second substrate comprising a second incoupling diffractive optical element configured to couple light into the second substrate, and a second outcoupling diffractive optical element configured to output, from the second substrate, light that has been coupled into the second substrate;
  wherein the first and second incoupling diffractive optical elements are substantially inverse of each other and the first and second outcoupling diffractive optical elements are substantially inverse of each other.

In examples, providing first substrate comprises using, directly or indirectly, a master mould; and
wherein providing the second substrate comprises using, directly or indirectly, the master mould.

In examples, the first and second substrates are stacked and at least a portion of the first and second substrates overlap.

In examples, the diffractive optical elements are sealed within the stack.

In examples, the second incoupling diffractive optical element is configured to couple into the second substrate light that has passed through the first incoupling diffractive optical element without being coupled into the first substrate.

In examples, the method comprises providing polarization rotation means and/or wavelength dependent filtering means between the first and second incoupling diffractive optical elements.

In examples, the method comprises providing a third substrate, the third substrate comprising a third incoupling diffractive optical element configured to couple light into the third substrate, and a third outcoupling diffractive optical element configured to output, from the third substrate, light that has been coupled into the third substrate, wherein:
the third incoupling diffractive optical element is configured to couple into the third substrate light that has passed through the first incoupling diffractive optical element without being coupled into the first substrate; and
the diffractive optical elements of the first and second substrates are configured to operate in a first spectral range and the diffractive optical elements of the third substrate are configured to operate in a second, at least partially different, spectral range.

In examples, the method comprises providing a fourth substrate, the fourth substrate comprising a fourth incoupling diffractive optical element configured to couple light into the fourth substrate, and a fourth outcoupling diffractive optical element configured to output, from the fourth substrate, light that has been coupled into the fourth substrate, wherein:
the fourth incoupling diffractive optical element is configured to couple into the fourth substrate light that has passed through the first incoupling diffractive optical element without being coupled into the first substrate; and
the third and fourth incoupling diffractive optical elements are substantially inverse of each other and the third and fourth outcoupling diffractive optical elements are substantially inverse of each other.

In examples, the first, second, third and fourth substrates are stacked and at least a portion of the first, second, third and fourth substrates overlap.

In examples, the first substrate comprises a first intermediate diffractive optical element configured to expand in a first and/or second dimension an exit pupil of light coupled into the first substrate; and
wherein the second substrate comprises a second intermediate diffractive optical element configured to expand in the first and/or second dimension an exit pupil of light coupled into the second substrate, wherein the first and second dimensions are different and wherein the first and second intermediate diffractive optical elements are substantially inverse of each other.

In examples, at least one of: substrate thickness, substrate shape, substrate materials, diffractive optical element materials and coatings differ between the first and second substrate.

In examples, the outcoupling diffractive optical elements are configured to expand an exit pupil of light coupled into the respective substrates.

According to various, but not necessarily all, embodiments there is provided a method of providing and/or manufacturing an apparatus and/or system as described herein.

According to various, but not necessarily all, embodiments there is provided a method of using an apparatus and/or system as described herein.

BRIEF DESCRIPTION

Some examples will now be described with reference to the accompanying drawings in which.

DETAILED DESCRIPTION

Figure 1:
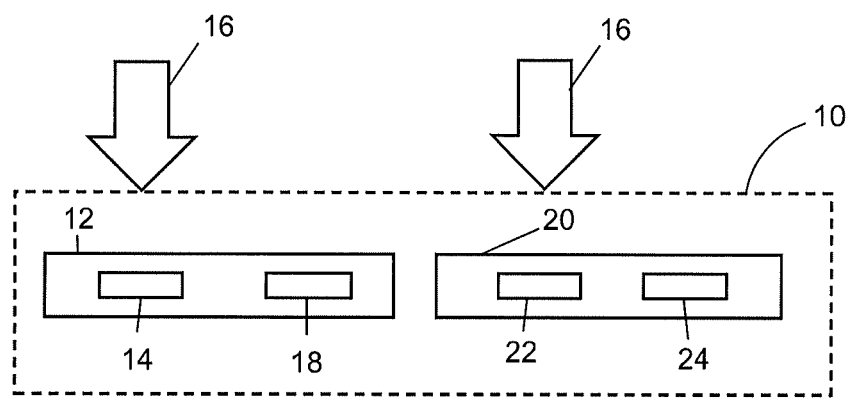
FIG. 1 shows an example of the subject matter described herein.

FIG. 1 shows a schematic example of an apparatus 10.

In the illustrated example, the apparatus 10 is an optical apparatus configured to expand an exit pupil of light 16 incident on the apparatus, such as light 16 from one or more light sources 56 or one or more projection engines. In some examples, the apparatus 10 can be considered an exit pupil expander.

One or more of the features discussed in relation to FIG. 1 can be found in one or more of the other figures.

The apparatus 10 of FIG. 1 comprises a first substrate 12 and a second substrate 20.

The first substrate 12 comprises a first incoupling diffractive optical element 14 configured to couple light 16 into the first substrate 12, and a first outcoupling diffractive optical element 18 configured to output, from the first substrate 12, light 16 that has been coupled into the first substrate 12.

The second substrate 20 comprises a second incoupling diffractive optical element 22 configured to couple light 16 into the second substrate 20, and a second outcoupling diffractive optical element 24 configured to output, from the second substrate 20, light 16 that has been coupled into the second substrate 20.

In the illustrated example, the first and second incoupling diffractive optical elements 14, 22 are substantially inverse of each other and the first and second outcoupling diffractive optical elements 18, 24 are substantially inverse of each other.

In examples, the first and second incoupling diffractive optical elements 14, 22 can be considered to be inverse of each other and the first and second outcoupling diffractive optical elements 18, 24 can be considered to be inverse of each other.

Accordingly, FIG. 1 illustrates an apparatus 10 comprising:
- a first substrate 12 comprising a first incoupling diffractive optical element 14 configured to couple light 16 into the first substrate 12, and a first outcoupling diffractive optical element 18 configured to output, from the first substrate 12, light 16 that has been coupled into the first substrate 12; and
- a second substrate 20 comprising a second incoupling diffractive optical element 22 configured to couple light 16 into the second substrate 20, and a second outcoupling diffractive optical element 24 configured to output, from the second substrate 20, light 16 that has been coupled into the second substrate 20;
- wherein the first and second incoupling diffractive optical elements 14, 22 are substantially inverse of each other and the first and second outcoupling diffractive optical elements 18, 24 are substantially inverse of each other.

In examples, the first substrate 12 and second substrate 20 can comprise or be any suitable substrate(s) 12. For example, the first substrate 12 and second substrate 20 can comprise or be any suitable substrate(s) for use in an optical apparatus, such as an exit pupil expander.

The first substrate 12 and second substrate 20 can comprise any suitable material or materials, such as any suitable optical material or materials. In examples, the first substrate 12 and/or second substrate 20 can comprise transparent glass material with high refractive index, or transparent polymer material with high refractive index. For examples, transparent glass material, or transparent polymer material having a specific refractive index value greater than 1.7.

In some examples the material of the first and/or second substrate can have a specific refractive index value of 1.8.

In examples the first and second substrates 12, 20 can be substantially the same or different. For example, the first and second substrates 12, 20 can comprise different material or materials, and/or can have different thickness and/or size and/or shape and/or form and/or characteristics and so on.

In some examples, the first substrate 12 can be considered a light guide, a plate, a light guide plate, and/or an exit pupil expander plate.

In some examples, the second substrate 20 can be considered a light guide, a plate, a light guide plate, and/or an exit pupil expander plate.

In examples, any suitable diffractive optical elements 14, 18, 22, 24 can be used.

For example, the apparatus 10 can comprise any suitable diffractive optical elements 14, 22 configured to couple light 16 into a substrate.

In examples, the apparatus 10 can comprise any suitable diffractive optical elements 18, 24 configured to output, from a substrate, light 16 that has been coupled into a substrate.

In some examples, one or more of the outcoupling diffractive optical elements of the apparatus 10 are configured to expand an exit pupil of light coupled into the respective substrates.

In examples, the diffractive optical elements 14, 18, 22, 24 can have any suitable size, shape and/or form and/or have any suitable characteristics. In examples the diffractive optical elements of the apparatus 10 can be different from one another.

For example, the first incoupling diffractive optical element 14 can be different from the second incoupling diffractive optical element 22.

Additionally, or alternatively, the first outcoupling optical element 18 can be different from the second outcoupling diffractive optical element 24.

In some examples, one or more of the diffractive optical elements 14, 18, 22, 24 can be and/or considered to be diffractive gratings, for example surface relief diffractive gratings.

In examples, the first incoupling diffractive optical element 14, and/or the first outcoupling diffractive optical element 18, and/or the second incoupling diffractive optical element 22 and/or the second outcoupling diffractive optical element 24 can be configured for transmissive or reflective incoupling and/or outcoupling respectively.

In examples, at least one of: substrate thickness, substrate materials, diffractive optical element materials and coatings differ between the first and second substrates 12, 20.

In the example of FIG. 1, the first and second incoupling diffractive optical elements 14, 22 are substantially inverse of each other and the first and second outcoupling diffractive optical elements 18, 24 are substantially inverse of each other.

However, in examples, the diffractive optical elements 14, 22 and 18, 24 can be considered to be inverse of each other or one another.

In examples, the diffractive optical elements 14, 22 and 18, 24 can be considered to be substantially inverse of each other because they are inverse of each other to within manufacturing tolerances.

In some examples, the diffractive optical elements 14, 22 and 18, 24 can be considered to be substantially inverse of each other because they are inverse of each other because they are produced, directly or indirectly, from a master mould and/or a child mould produced from the master mould.

As used herein, substantially inverse of each other can be considered to mean that the diffractive features of the respective first and second diffractive optical elements are substantially inverse of each other or one another and/or opposite of each other or one another.

In some examples, it can be considered that the respective first and second diffractive gratings are substantially inverse of each other or one another. In some examples, it can be considered that the respective first and second diffractive grating patterns are substantially inverse of each other or one another.

In examples the respective first and second diffractive optical elements 14, 22 and 18, 24 can be considered to be opposite of each other or one another.

Figure 2:
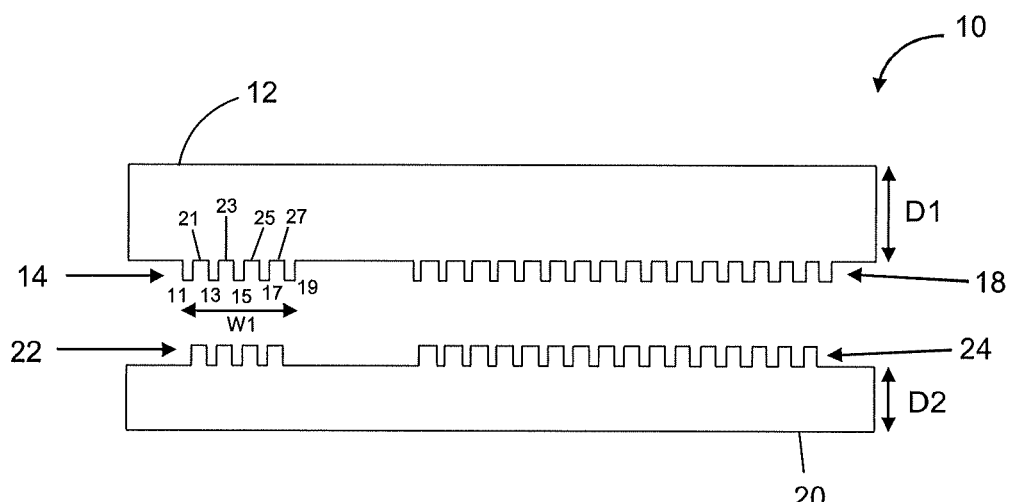
FIG. 2 shows another example of the subject matter described herein.

Reference is made to FIG. 2 which illustrates an example of diffractive optical elements that are substantially inverse of each other or one another.

The example of FIG. 2 shows a cross section of an apparatus 10 comprising first and second substrates 12, 20.

The first substrate 12 of FIG. 2 comprises a first incoupling diffractive optical element 14. The first incoupling diffractive optical element 14 comprises a plurality of protrusions 11, 13, 15, 17, 19 and a plurality of recesses 21, 23, 25, 27 distributed across the width w of the first diffractive optical element 14.

In some examples, protrusions can be considered protruding grating lines. In some examples, recesses can be considered gaps between grating lines.

Adjacent protrusions (for example, those denoted by reference numerals 11 and 13) are separated by a recess (in this instance, denoted by reference numeral 21). Similarly, adjacent recesses are separated by a protrusion.

The protrusions 11, 13, 15, 17, 19 and recesses 21, 23, 25, 27 of the first incoupling diffractive optical element 14 can be considered the diffractive features of the first incoupling diffractive optical element 14.

The second substrate 20 of FIG. 2 comprises a second incoupling diffractive optical element 22. The second incoupling diffractive optical element also comprises a plurality of protrusions 31, 33, 35, 37 and a plurality of recesses 39, 41, 43.

Adjacent protrusions of the second incoupling diffractive optical element 22 are separated by a recess and adjacent recesses of the second incoupling diffractive optical element 22 are separated by a protrusion.

The protrusions 31, 33, 35, 37 and recesses 39, 41, 43 of the second incoupling diffractive optical element 22 can be considered the diffractive features of the second incoupling diffractive optical element 22.

As can be seen in FIG. 2, where the first incoupling diffractive optical element 14 has a protrusion the second incoupling diffractive optical element 22 has a recess. Similarly, where the second incoupling diffractive optical element 22 has a protrusion the first incoupling diffractive optical element 14 has a recess.

For example, protrusion 13 of the first incoupling diffractive optical element 14 corresponds to recess 39 of the second incoupling diffractive optical element 22.

Similarly, protrusion 35 of the second incoupling diffractive optical element 22 corresponds to recess 25 of the first incoupling diffractive optical element 14.

In this way the first incoupling diffractive optical element 14 and the second incoupling diffractive optical element 22 are substantially inverse and/or opposite of each other or one another. That is, in examples, the first and second diffractive optical elements can be considered substantially inverse and/or opposite because the first protrudes where the second recedes and the second protrudes where the first recedes.

It can also be considered that the diffractive features of the first incoupling diffractive optical element 14 and the diffractive features of the second incoupling diffractive optical element 22 are substantially inverse and/or opposite of each other or one another.

It can also be considered that the second incoupling diffractive optical element 22 is substantially the inverse and/or opposite of the first incoupling diffractive optical element 14 and that the first incoupling diffractive optical element 14 is substantially the inverse and/or opposite of the second incoupling diffractive optical element 22.

It can also be considered that the diffractive features of the second incoupling diffractive optical element 22 are substantially the inverse and/or opposite of the diffractive features of the first incoupling diffractive optical element 14 and that the diffractive features of the first incoupling diffractive optical element 14 are substantially the inverse and/or opposite of the diffractive features of the second incoupling diffractive optical element 22.

In examples, the diffractive features can be considered patterns, and/or gratings and/or grating patterns and so on.

Due to the finite nature of the diffractive optical elements 14, 22, the protrusions 11, 19 at the edge of the first incoupling diffractive optical element 14 do not have complete corresponding recesses in the second incoupling diffractive optical element 22.

However, this can be considered substantially inverse as the second incoupling diffractive optical element is recessed where the first incoupling diffractive optical element protrudes.

In the example of FIG. 2, the diffractive optical elements 14, 22, 18, 24 are binary diffractive optical elements for the purposes of clarity. However, this principle relates generally to any suitable diffractive optical elements of the apparatus 10. For example, diffractive optical elements having different grating pitch and/or depth (FIG. 13A) and/or grating profile (FIG. 13B) and so on.

Figures 13A, 13B:
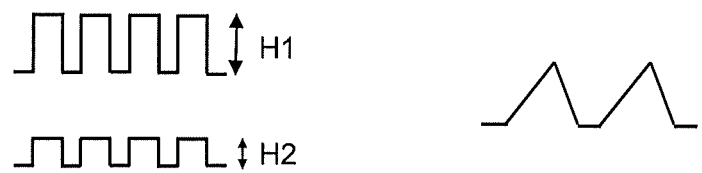
FIGS. 13A and 13B show other examples of the subject matter described herein.

See, for example, FIG. 13A which illustrates different grating depths. In the example of FIG. 13A, a grating having a first depth H1 and a second grating having a second depth H2 are shown. In the Illustrated examples H1 is greater than H2.

FIG. 13B illustrates an example of a non-binary diffractive optical element, having a different grating profile.

It can also be seen, in FIG. 2, that the first outcoupling diffractive optical element 18 and the second outcoupling diffractive optical element 24 are similarly substantially inverse of each other.

In the example of FIG. 2, the first and second outcoupling diffractive optical elements 18, 24 employ fill ratio modulation, where the fill ratio of the binary grating varies between different regions of the diffractive optical element, in order to, for example, change the outcoupling efficiency between these regions.

As the first and second outcoupling diffractive optical elements 18, 24 are substantially inverse of each other the fill ratio modulation is present in substantially the inverse or opposite sense in the first and second outcoupling diffractive optical elements 18, 24.

That is, the fill ratio modulation in the first outcoupling diffractive optical element 18 is substantially inverse or opposite to the fill ratio modulation in the second outcoupling diffractive optical element 22.

In examples any suitable modulation of one or more grating features and/or characteristics can be used. For example, depth modulation, where the grating depth is varied between different regions of the diffractive optical elements. See, for example, FIG. 4.

In examples, any sort of modulation of a first diffractive optical element can be employed in substantially the inverse or opposite sense in a corresponding or respective second diffractive optical element.

Referring again to FIG. 1, the first and second incoupling diffractive optical elements 14, 22 are configured to couple light into the first substrate 12 and second substrate 20 respectively.

The incoupling diffractive optical elements 14, 22 can be configured to operate with any suitable light 16, including any suitable spectral range or ranges.

In examples, the first and second incoupling diffractive optical elements 14, 22 are configured to receive light 16 from the same and/or different sources, for example one or more light sources 56 and/or projection engines.

In examples, the light 16 can be considered to comprise a plurality of light beams.

In some examples, the first and second substrates 12, 20 are stacked and at least a portion of the first and second substrates overlap. See, for example, FIGS. 2, 3, 4, 5 and/or 8.

In examples stacking can be done in any suitable way. For example, stacking can be done by bonding and/or joining and/or laminating the substrates together. In some examples adhesive (not illustrated), such as double-sided adhesive film, can be used on areas in the region of or near the bezels of the substrates.

In some examples, the substrates of the apparatus substantially wholly or completely overlap.

In some examples the diffractive optical elements 14, 18, 22, 24 are sealed within the stack 26.

In some examples, the second incoupling diffractive optical element 22 is configured to couple into the second substrate 20 light 16 that has passed through the first incoupling diffractive optical element 14 without being coupled into the first substrate 12. See, for example, FIGS. 3, 4 and/or 5.

In some examples, the first substrate 12, including the diffractive optical elements 14, 18, is produced, directly or indirectly, from a master mould and the second substrate 20, including the diffractive optical elements 22, 24, is also produced, directly or indirectly, from the master mould.

For example, the use of a master mould in this way can automatically provide substantially the inverse or opposite properties of the respective diffractive optical elements. See, for example, FIG. 10.

In examples, the apparatus 10 can comprise any number of additional elements not illustrated in the example of FIG. 1.

For example, the apparatus 10 can comprise any suitable number of additional substrates and/or additional diffractive optical elements.

A technical advantage provided by the apparatus 10 is improved efficiency. For example, at least part of the light wasted through the first incoupling diffractive optical element 14 can be circulated in the second substrate 20.

Additionally, or alternatively, the second substrate 20, or exit pupil expander, can compensate for nonuniformities of the first substrate 12, or exit pupil expander, by having differently overlapping exit pupils and/or by balancing the expansion/outcoupling over the outcoupling diffractive optical elements differently.

Additionally, or alternatively tolerances in manufacture can be looser and/or the amount of modulated features (for example fill ratio) can be reduced while still achieving specified quality.

Additionally, or alternatively, in examples the diffractive optical elements are sealed in a stack, preventing damage to these sensitive components.

Additionally, or alternatively, the use of a single master mould in producing the first and second substrates can provide for efficient production with reduced costs.

FIG. 2 illustrates an example of an apparatus 10. The apparatus 10 is shown in cross section. In examples, the apparatus 10 of FIG. 2 can be an apparatus 10 as described in relation to FIG. 1.

Accordingly, one or more features of the apparatus 10 of FIG. 2 can be as described in relation to FIG. 1.

In the example of FIG. 2, the apparatus 10 comprises a first substrate 12, comprising a first incoupling diffractive optical element 14 and a first outcoupling diffractive optical element 18.

The apparatus of FIG. 2 also comprises a second substrate 20, comprising a second incoupling diffractive optical element 22 and a second outcoupling diffractive optical element 24.

In the example of FIG. 2, the first and second substrates 12, 20 are stacked and the first and second substrates 12, 20 substantially totally or completely overlap. However, in other examples, the first and second substrates 12, 20 partially overlap.

In the example of FIG. 2 the apparatus 10 is presented for the purposes of clarity and is not drawn to scale. For example, the diffractive features of the diffractive optical elements are exaggerated for the purposes of illustration.

In the example of FIG. 2 the diffractive optical elements 14, 22, 18, 24 are binary diffractive gratings. However, in examples, any suitable diffractive optical elements can be used, such as gratings with blazed, sinusoidal, or slanted grating profiles.

In the example of FIG. 2, the first incoupling diffractive element 14 is configured for reflective incoupling and the second incoupling diffractive element 22 is configured for transmissive incoupling. This is advantageous as it allows the diffractive optical elements to be sealed in a stack 26. See, for example, FIGS. 3, 4 and/or 5.

The first and second incoupling diffractive optical elements 14, 22 and the first and second outcoupling diffractive optical elements 18, 24 are substantially inverse/opposite of each other. The outcoupling diffractive optical elements 18, 24 employ fill ratio modulation.

In the example of FIG. 2, the first substrate 12 has a depth or thickness D1 and the second substrate 20 has a depth or thickness D2. In this example the depth or thickness D1 of the first substrate 12 is larger than the depth or thickness D2 of the second substrate 20. This can be advantageous for uniformity of exit pupils. See, for example, FIGS. 4 and/or 5.

In the example of FIG. 2 the second incoupling diffractive optical element 22 is configured to couple into the second substrate 20 light 16 that has passed through the first incoupling diffractive optical element 14 without being coupled into the first substrate 12. See, for example, FIGS. 3, 4 and/or 5.

Figure 3:
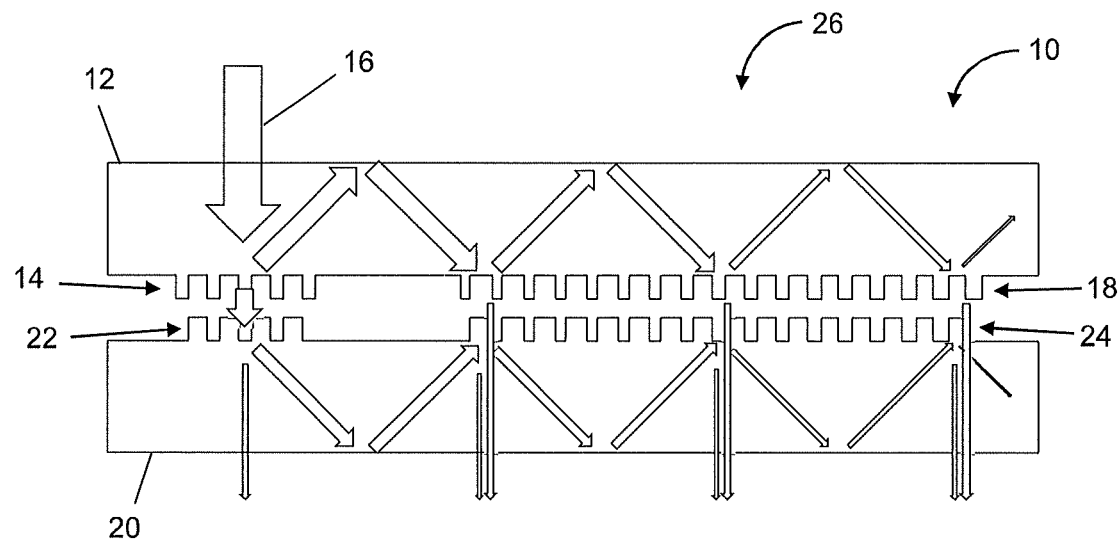
FIG. 3 shows another example of the subject matter described herein.

FIG. 3 illustrates an example of an apparatus 10. The apparatus 10 is shown in cross section. In examples, the apparatus 10 of FIG. 3 can be an apparatus 10 as described in relation to FIG. 1. Accordingly, one or more features of the apparatus 10 of FIG. 3 can be as described in relation to FIG. 1.

The apparatus 10 shown in the example of FIG. 3 is similar to the apparatus 10 of FIG. 2. However, in the example of FIG. 3, the depths or thicknesses D1, D2, of the substrates 12, 20 are substantially equal. The substrates 12, 20 of FIG. 3 are in a stack 26.

In the example of FIG. 3 the apparatus 10 is presented for the purposes of clarity and is not drawn to scale. For example, the diffractive features of the diffractive optical elements are exaggerated for the purposes of illustration.

In the example of FIG. 3 the diffractive optical elements 14, 22, 18, 24 are binary diffractive gratings. However, in examples, any suitable diffractive optical elements can be used.

The path of light 16 through the apparatus 10 is schematically illustrated in FIG. 3 by the broad arrows. The width of the arrow in FIG. 3 is intended to generally indicate intensity of light 16 for the purpose of illustration, but are not drawn to scale.

In the example of FIG. 3 wider arrows are intended to indicate higher intensity of light 16 and narrower arrows are intended to indicate lower intensity of light 16.

The arrows can be considered to illustrate light beams.

In the example of FIG. 3 light 16 is directed towards the first incoupling diffractive optical element 14. The light 16 can be considered to be and/or comprise one or more light beams. In examples, the light 16 can be from a light source 56, such as a projection engine. See, for example, FIG. 9.

The light 16 passes through the first substrate 12 and is incident upon the first incoupling diffractive optical element 14. A portion of the incident light 16 is coupled into the first substrate 12, by the first incoupling diffractive optical element 14, and undergoes total internal reflection within the first substrate 12.

As the light 16 travels across or along the first substrate 12 it is incident upon or meets the first outcoupling diffractive optical element 18 on multiple occasions. When the incoupled light 16 is incident upon or meets the first outcoupling diffractive optical element 18, a portion of the light is output or outcoupled from the first substrate 12.

The light 16 output or outcoupled from the first substrate 12 passes through the second outcoupling diffractive optical element 24 and the second substrate 20 directly or indirectly towards an eye or eyes of a user.

In the example of FIG. 3, light 16 that is not coupled into the first substrate 12 passes through the first diffractive optical element 14 and is incident on the second incoupling diffractive optical element 22. In some examples the light 16 that passes through the first incoupling diffractive optical element can undergo one or more redirections before being incident upon the second incoupling diffractive optical element 22.

At least a portion of the incident light 16 is coupled into the second substrate 20, by the second incoupling diffractive optical element 22, and undergoes total internal reflection within the second substrate 20.

Accordingly, FIG. 3 illustrates an example of an apparatus 10 in which the second incoupling diffractive optical element 22 is configured to couple into the second substrate 20 light 16 that has passed through the first incoupling diffractive optical element 14 without being coupled into the first substrate 12.

As the light 16 travels across or along the second substrate 20 it is incident upon or meets the second outcoupling diffractive optical element 24 on multiple occasions. When the incoupled light 16 is incident upon or meets the second outcoupling diffractive optical element 24, a portion of the light 16 is output or outcoupled from the second substrate 20.

The light 16 output or outcoupled from the second substrate 20 passes through the second substrate 20 directly or indirectly towards an eye or eyes of a user.

In the example of FIG. 3, a portion of the incident light 16 is also not coupled into the second substrate 20 and passes out of the apparatus 10. In some examples the light 16 passes on to one or more further substrates. See, for example, FIG. 4.

Figure 4:
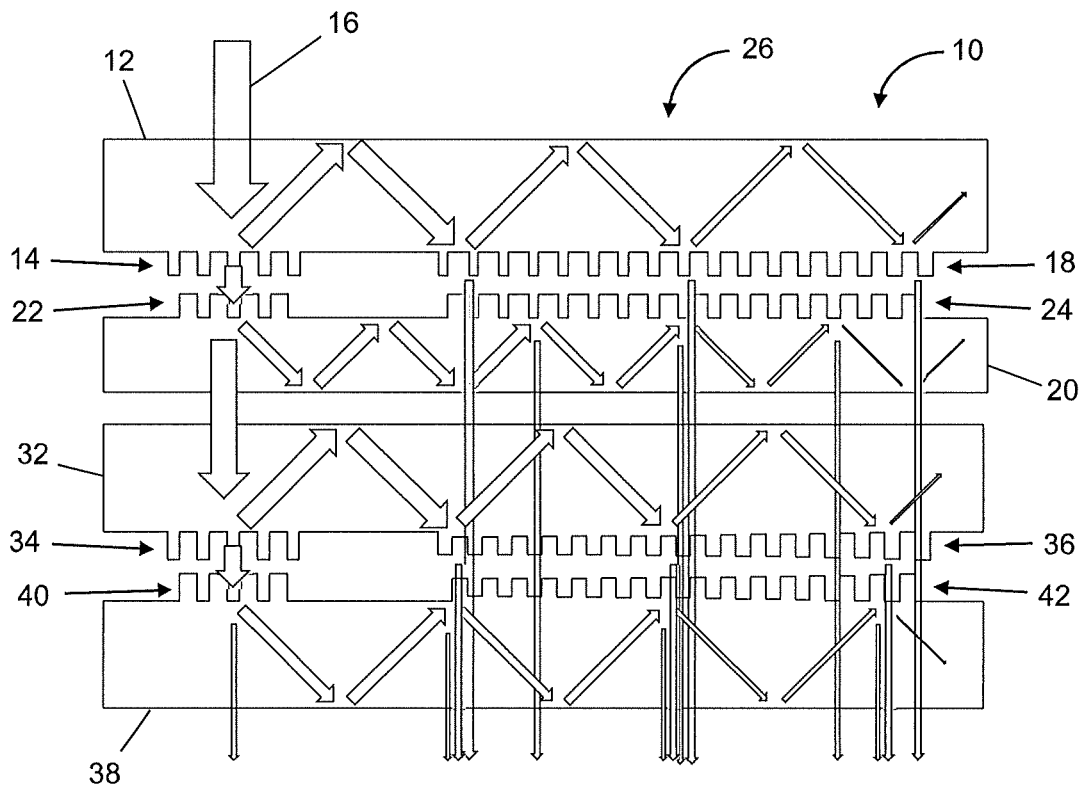
FIG. 4 shows another example of the subject matter described herein.

FIG. 4 illustrates an example of an apparatus 10. The apparatus 10 is shown in cross section.

In examples, the apparatus 10 of FIG. 4 can be an apparatus 10 as described in relation to FIG. 1. Accordingly, one or more features of the apparatus 10 of FIG. 4 can be as described in relation to FIG. 1.

The apparatus 10 of FIG. 4 comprises a first and second substrate 12, 20 and associated diffractive optical elements 14, 22, 18, 24. The first and second substrate 12, 20, and the associated diffractive optical elements 14, 22, 18, 24 are similar to those of FIG. 3.

However, in the example of FIG. 4, the depth or thickness of the second substrate 20 is less than the depth or thickness of the first substrate 12.

Broad arrows are also shown in FIG. 4 to illustrate the passage of light 16 through the apparatus 10.

The passage of light 16 through the first and second substrates 12, 20 is generally similar to the example of FIG. 3. However, in FIG. 4, due to the differences in substrate depth or thickness between the first and second substrates 12, 20, light 16 is outcoupled from the second substrate 20 from at least one or more different locations or points compared to the first substrate 12.

This is advantageous as the outcoupled exit pupils are spread, achieving better uniformity.

In the example of FIG. 4, the apparatus 10 comprises a third substrate 32. The third substrate 32 comprises a third incoupling diffractive optical element 34 configured to couple light 16 into the third substrate 32, and a third outcoupling diffractive optical element 36 configured to output, from the third substrate 32, light that has been coupled into the third substrate 32.

In some examples, the description of the first and/or second substrates 12, 20 in relation to FIG. 1 can apply to the third substrate 32.

In some examples, the description of the first and/or second incoupling diffractive optical elements 14, 22 can apply to the third incoupling diffractive optical element 34.

In some examples, the description of the first and/or second outcoupling diffractive optical elements 18, 24 can apply to the third outcoupling diffractive optical element 34.

Accordingly, the third substrate 32, the third incoupling diffractive optical element 34 and the third outcoupling diffractive optical element 36 can have any suitable shape, size form and/or characteristics and so on.

In the illustrated example, the third incoupling diffractive optical element 34 is configured to couple into the third substrate 32 light 16 that has passed through the first incoupling diffractive optical element 14 without being coupled into the first substrate 12.

In the example of FIG. 4, the third substrate 32 is stacked with the first and second substrates 12, 20 and substantially wholly or totally overlaps the first and second substrates 12, 20. However, in some examples, the third substrate 32 can partially overlap or not overlap the first and/or second substrates 12, 20.

In FIG. 4 the first, second and third substrates 12, 20, 32 are in a stack 26 and the third incoupling diffractive optical element 34 is configured to receive light that has passed through both the first and second incoupling diffractive optical elements 14, 22 without being coupled into the first or second substrates 12, 20.

That is, in the example of FIG. 4, light 16 incident on the third incoupling diffractive optical element 34 has passed through both the first and second substrates 12, 20, including both first and second incoupling diffractive optical elements 14, 22.

However, in examples, any suitable arrangement can be used and the apparatus 10 can be configured in any suitable way.

In the example of FIG. 4, the diffractive optical elements 14, 22, 18, 24 of the first and second substrates 12, 20 are configured to operate in a first spectral range and the diffractive optical elements 34, 36 of the third substrate 32 are configured to operate in a second, at least partially different, spectral range.

However, in examples, the diffractive optical elements can be configured to operate in any suitable spectral range or ranges that are substantially the same or at least partially different.

In examples it can be considered that the diffractive optical elements 14, 22, 18, 24 of the first and second substrates 12, 20 are configured to operate in a first spectral range because the diffractive optical elements 14, 22, 18, 24 of the first and second substrates 12, 20 are configured to operate more efficiently in the first spectral range compared to other spectral ranges, with the given substrate materials.

For example, it can be considered that the diffractive optical elements 14, 22, 18, 24 of the first and second substrates 12, 20 are configured to operate with one or more colours of light 16. In examples, it can be considered the diffractive optical elements 14, 22, 18, 24 of the first and second substrates 12, 20 are configured to operate with one or more wavelengths of light 16.

Similarly, in examples it can be considered that the diffractive optical elements 34, 36 of the third substrate 32 are configured to operate in a second, at least partially different, spectral range because the diffractive optical elements 34, 36 of the third substrate 32 are configured to operate more efficiently in the second, at least partially different spectral range, compared to other spectral ranges.

For example, it can be considered that the diffractive optical elements 34, 36 of the third substrate 32 are configured to operate with one or more different, or at least partially different, colours of light.

In examples, the first spectral range overlaps with the second spectral range. In some examples the first and second spectral ranges do not overlap.

In some examples it can be considered that the diffractive optical elements 14, 22, 18, 24 of the first and second substrates 12, 20 are optimized to operate in the first spectral range and the diffractive optical elements 34, 36 of the third substrate 32 are optimized to operate in the second spectral range.

It is noted that the diffractive optical elements 14, 22, 18, 24, 34, 36 are illustrated for the purposes of clarity and are not intended to illustrate physical differences for configuration for at least partially different spectral ranges.

In the example of FIG. 4 the first and second incoupling diffractive optical elements 14, 22 are configured to preferentially incouple light 16 in the first spectral range. Accordingly, light 16 in the second, at least partially different, spectral range will more readily pass through the first and second incoupling diffractive optical elements 14, 22 and become incident on or meet the third incoupling diffractive optical element 34.

At least a portion of the incident light 16 is coupled into the third substrate 32, by the third incoupling diffractive optical element 34, and undergoes total internal reflection within the third substrate 32.

As the light 16 travels across or along the third substrate 32 it is incident upon or meets the third outcoupling diffractive optical element 36 on multiple occasions. When the incoupled light 16 is incident upon or meets the third outcoupling diffractive optical element 36, a portion of the light 16 is output or outcoupled from the third substrate 32.

The light 16 output or outcoupled from the third substrate 32 travels directly or indirectly towards an eye or eyes of a user.

In the example of FIG. 4, a portion of the incident light 16 is also not coupled into the third substrate 32 and passes through the third incoupling diffractive optical element 34.

In the illustrated example, light 16 output or outcoupled from the first and second substrates 12, 20 passes through the third substrate 32 and third outcoupling diffractive optical element 36 as the light 16 passes out of the apparatus 10. However, in examples, any suitable setup can be used and the apparatus 10 can be configured in any suitable way.

FIG. 4 illustrates an example of an apparatus 10 comprising a third substrate 32, the third substrate 32 comprising a third incoupling diffractive optical element 34 configured to couple light 16 into the third substrate 32, and a third outcoupling diffractive optical element 36 configured to output, from the third substrate 32, light 16 that has been coupled into the third substrate 32, wherein:

the third incoupling diffractive optical element 34 is configured to couple into the third substrate 32 light 16 that has passed through the first incoupling diffractive optical element 14 without being coupled into the first substrate 12; and the diffractive optical elements 14, 22, 18, 24 of the first and second substrates 12, 20 are configured to operate in a first spectral range and the diffractive optical elements 34, 36 of the third substrate 32 are configured to operate in a second, at least partially different, spectral range.

In the example of FIG. 4, the apparatus 10 comprises a fourth substrate 38. The fourth substrate 38 comprises a fourth incoupling diffractive optical element 40 configured to couple light 16 into the fourth substrate 38, and a fourth outcoupling diffractive optical element 42 configured to output, from the fourth substrate 38, light 16 that has been coupled into the fourth substrate 38.

In some examples, the description of the first and/or second substrates 12, 20 in relation to FIG. 1 can apply to the fourth substrate 38.

In some examples, the description of the first and/or second incoupling diffractive optical elements 14, 22 can apply to the fourth incoupling diffractive optical element 40.

In some examples, the description of the first and/or second outcoupling diffractive optical elements 18, 24 can apply to the fourth outcoupling diffractive optical element 42.

Accordingly, the fourth substrate 38, the fourth incoupling diffractive optical element 40 and the fourth outcoupling diffractive optical element 42 can have any suitable shape, size, form and/or characteristics and so on.

In the illustrated example, the fourth incoupling diffractive optical element 40 is configured to couple into the fourth substrate 38 light 16 that has passed through the first incoupling diffractive optical element 14 without being coupled into the first substrate 12.

In the example of FIG. 4, the fourth substrate 38 is stacked with the first, second, and third substrates 12, 20, 32 and substantially wholly or totally overlaps the first, second, and third substrates 12, 20, 32. However, in some examples, the fourth substrate 38 can partially overlap or not overlap the first and/or second and/or third substrates 12, 20, 32.

Accordingly, FIG. 4 illustrates an example of an apparatus 10 wherein the first 12, second 20, third 32, and fourth 38 substrates are stacked and at least a portion of the first 12, second 20, third 32, and fourth 38 substrates overlap.

In FIG. 4 the first, second, third, and fourth substrates 12, 20, 32, 38 are in a stack 26 and the fourth incoupling diffractive optical element 40 is configured to receive light 16 that has passed through the first, second, and third incoupling diffractive optical elements 14, 22, 34 without being coupled into the first, second, or third substrates 12, 20, 32.

That is, in the example of FIG. 4, light 16 incident on the fourth incoupling diffractive optical element 40 has passed through the first, second, and third substrates 12, 20, 32 including the first, second, and third incoupling diffractive optical elements 14, 22, 34.

However, in examples, any suitable arrangement can be used and the apparatus 10 can be configured in any suitable way.

In the example of FIG. 4, the diffractive optical elements 40, 42 of the fourth substrate 38 are configured to operate in the second spectral range. However, in examples, the diffractive optical elements 40, 42 of the fourth substrate 38 can be configured to operate in any suitable spectral range.

In examples it can be considered that the diffractive optical elements 40, 42 of the fourth substrate 38 are configured to operate in the second spectral range because the diffractive optical elements 40, 42 of the fourth substrates 38 are configured to operate more efficiently in the second spectral range compared to other spectral ranges.

For example, it can be considered that the diffractive optical elements 40, 42 of the fourth substrate 38 are configured to operate with one or more colours of light 16.

In some examples it can be considered that the diffractive optical elements 40, 42 of the fourth substrate 38 are optimized to operate in the second spectral range.

It is noted that the diffractive optical elements 40, 42 are illustrated for the purposes of clarity and are not intended to illustrate physical differences for configuration for a spectral range.

In the example of FIG. 4 the third and fourth incoupling diffractive optical elements 34, 40 are substantially inverse of each other or one another and the third and fourth outcoupling diffractive optical elements 36, 42 are substantially inverse of each other or one another.

In examples, the third and fourth incoupling diffractive optical elements 34, 40 can be considered to be inverse of each other or one another and the third and fourth outcoupling diffractive optical elements 36, 42 can be considered to be inverse of each other or one another.

In examples the third and fourth incoupling diffractive optical elements 34, 40 can be considered to be opposite of each other or one another and the third and fourth outcoupling diffractive optical elements 36, 42 can be considered to be opposite of each other or one another.

Accordingly, FIG. 4 illustrates an example of an apparatus 10 comprising a fourth substrate 38, the fourth substrate 38 comprising a fourth incoupling diffractive optical element 40 configured to couple light 16 into the fourth substrate 38, and a fourth outcoupling diffractive optical element 42 configured to output, from the fourth substrate 38, light 16 that has been coupled into the fourth substrate 38, wherein:
  the fourth incoupling diffractive optical element 40 is configured to couple into the fourth substrate 38 light 16 that has passed through the first incoupling diffractive optical element 14 without being coupled into the first substrate 12; and
  the third and fourth incoupling diffractive optical elements 34, 40 are substantially inverse of each other and the third and fourth outcoupling diffractive optical elements 36, 42 are substantially inverse of each other.

At least a portion of the light 16 incident on the fourth incoupling diffractive optical element 40 is coupled into the fourth substrate 38, by the fourth incoupling diffractive optical element 40, and undergoes total internal reflection within the fourth substrate 38.

As the light 16 travels across or along the fourth substrate 38 it is incident upon or meets the fourth outcoupling diffractive optical element 42 on multiple occasions. When the incoupled light 16 is incident upon or meets the fourth outcoupling diffractive optical element 42, a portion of the light 16 is output or outcoupled from the fourth substrate 38.

The light 16 output or outcoupled from the fourth substrate 38 travels directly or indirectly towards an eye or eyes of a user.

In the example of FIG. 4, a portion of the incident light 16 is also not coupled into the fourth substrate 38 and passes through the fourth incoupling diffractive optical element 40 and fourth substrate 38 and exits the apparatus 10.

In the illustrated example, light 16 output or outcoupled from the first and second substrates 12, 20 passes through the third and fourth substrates 32, 38 and third and fourth outcoupling diffractive optical elements 36, 42 as the light 16 passes out of the apparatus 10. However, in examples, any suitable setup can be used and the apparatus 10 can be configured in any suitable way.

In the example of FIG. 4, the third and fourth diffractive optical elements 36, 42 employ grating depth modulation, where the depth of the binary grating varies between different regions of the diffractive optical element, in order to, for example, change the outcoupling efficiency between these regions.

In the example of FIG. 4, the apparatus comprises four substrates 12, 20, 32, 38. However, in examples, the apparatus can comprise any suitable number of substrates, configured in any suitable way.

For example, in the example of FIG. 4 the first and second substrates 12, 20 and the third and fourth substrates 32, 38 can be considered substantially inverse pairs and/or inverse pairs of substrates because the diffractive optical elements of the first and second substrates 12, 20 and the third and fourth substrates 32, 38 are substantially inverse or opposite of each other or one another.

In the example of FIG. 4 the apparatus 10 comprises two substantially inverse pairs of substrates 12, 20 and 32, 38, configured to operate in at least partially different spectral ranges.

However, in examples, the apparatus 10 can comprise any suitable number of substantially inverse pairs of substrates configured to operate in any suitable number of spectral ranges.

Additionally, or alternatively, the apparatus 10 can comprise any suitable number of single substrates, without a corresponding substantially inverse and/or inverse pair, configured in any suitable way.

Although, in the example of FIG. 4, the substantially inverse pairs of substrates 12, 20 and 32, 38 are adjacent, in some examples the substrates of the apparatus 10 can be in any suitable order. See, for example, FIG. 8.

In the example of FIG. 4, the substrates are configured with the incoupling diffractive optical elements 14, 22, 34, 40 substantially aligned in the stack 26 and the outcoupling diffractive optical elements 18, 24, 36, 42 substantially aligned in the stack 26.

However, in examples, the substrates of the apparatus 10, and the associated diffractive optical elements, can be configured in any suitable way. For example, light 16 can be redirected between substrates.

In some examples at least one of: substrate thickness, substrate shape, substrate materials, diffractive optical element materials and coatings differ between the substrates of the apparatus 10.

In examples, one or more of the outcoupling diffractive optical elements of the apparatus 10 is configured to expand an exit pupil of light coupled into the respective substrate(s).

In the example of FIG. 4, the diffractive optical elements 14, 22, 34, 40, 18, 24, 36, 42 of the substrates 14, 22, 34, 40 are sealed within the stack 26. This is advantageous as it provides protection for the sensitive components.

Figure 5:
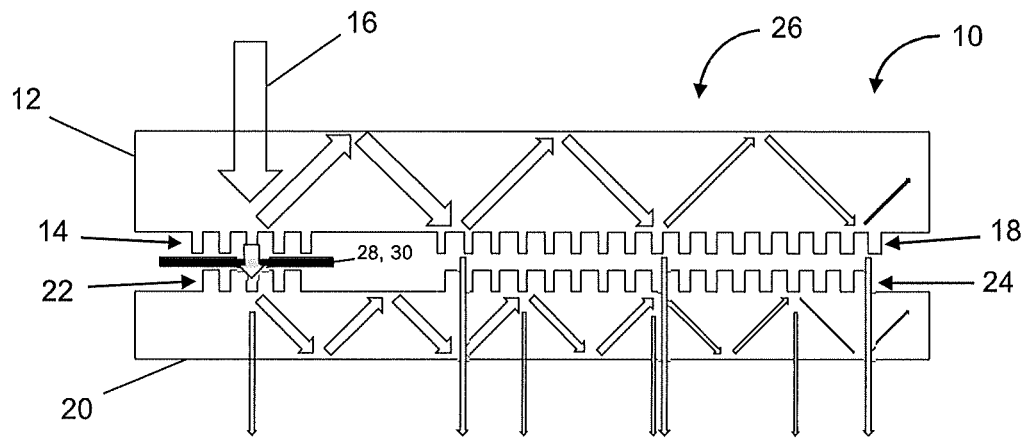
FIG. 5 shows another example of the subject matter described herein.

FIG. 5 illustrates an example of an apparatus 10. The apparatus 10 is shown in cross section.

In examples, the apparatus 10 of FIG. 5 can be an apparatus 10 as described in relation to FIG. 1. Accordingly, one or more features of the apparatus 10 of FIG. 5 can be as described in relation to FIG. 1.

The apparatus 10 of FIG. 5 comprises a first and second substrate 12, 20 and associated diffractive optical elements 14, 22, 18, 24. The first and second substrate 12, 20, and the associated diffractive optical elements 14, 22, 18, 24 are similar to those of FIG. 3.

However, in the example of FIG. 5, the depth or thickness of the second substrate 20 is less than the depth or thickness of the first substrate 12.

Broad arrows are also shown in FIG. 5 to illustrate the passage of light 16 through the apparatus 10.

The passage of light 16 through the first and second substrates 12, 20 is generally similar to the example of FIG. 3. However, in FIG. 5, due to the differences in substrate depth or thickness between the first and second substrates 12, 20, light is outcoupled from the second substrate 20 at one or more different locations or points compared to the first substrate 12.

In the example of FIG. 5, the apparatus 10 comprises polarization rotation means 28 and/or wavelength dependent filtering means 30 between the first and second incoupling diffractive optical elements 14, 22.

Accordingly, FIG. 5 illustrates an example of an apparatus 10 comprising polarization rotation means 28 and/or wavelength dependent filtering means 30 between the first and second incoupling diffractive optical elements 14, 22.

In examples, polarization rotation means can be considered a polarization rotator, and/or polarization rotation apparatus, and/or polarization rotation optical element(s), and/or a polarization retarder, and/or one or more optical components configured to rotate polarization of light 16.

In examples, wavelength dependent filtering means can be considered a wavelength dependent filter, and/or a wavelength dependent filtering apparatus, and/or a wavelength dependent filtering optical element(s), and/or one or more optical components configured to filter light 16 dependent on wavelength.

In examples, any suitable polarization rotation means 28 and/or wavelength dependent filtering means 30 can be used. For example, a lambda/2 or ½ wave retarder film.

The use of polarization means 28 is advantageous as it can improve efficiency of the apparatus 10.

In examples, the incoupling diffractive optical element is typically polarization sensitive. This can be especially true if the light 16 is unpolarized (for example originating from a digital light processing (DLP) projector).

In examples, a first polarization can be incoupled into the first substrate 12 with better efficiency and another polarization can be more efficiently incoupled to the second substrate 20 after rotating the polarization of the light 16. For example, linear polarization of light 16 can be rotated by 90°.

The use of wavelength dependent filtering means 30 is advantageous as it can improve efficiency of the apparatus 10.

For example, use of wavelength dependent filtering means 30 can provide control of passage of light 16 of different spectral ranges in the apparatus 10.

In examples the apparatus 10 can comprise any suitable number of polarization rotation means 28 and/or wavelength dependent filtering means 30 at any suitable location or locations in the apparatus 10.

For example, polarization rotation means 28 and/or wavelength dependent filtering means 30 could be located between the first and second substrates 12, 20 and the third and fourth substrates 32, 38 in the example of FIG. 4.

Figure 6:
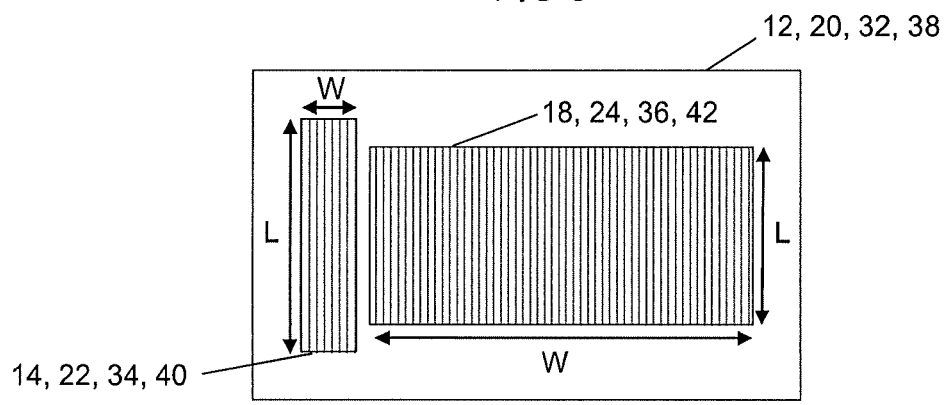
FIG. 6 shows another example of the subject matter described herein.

FIG. 6 illustrates an example of a substrate. In the example of FIG. 6 a front view of the substrate is shown.

The substrate shown in the example of FIG. 6 is an example of a substrate of an apparatus 10 as described herein, for example an apparatus 10 as described in relation to FIGS. 1 and/or 2 and/or 3 and/or 4 and/or 5.

Accordingly, in examples, the substrate shown in the example of FIG. 6 is an example of a first substrate 12, and/or a second substrate 20 and/or a third substrate 32 and/or a fourth substrate 38 and associated diffractive optical elements (14, 22, 34, 40, 18, 24, 36, 42) as described herein.

In the example of FIG. 6, the substrate comprises an incoupling diffractive optical element and an outcoupling diffractive optical element. In examples, the incoupling diffractive optical element in FIG. 6 is an example of the first 14, and/or second 22, and/or third 34, and/or fourth 40 incoupling diffractive optical elements.

The incoupling diffractive optical element of FIG. 6 is generally rectangular in shape, having a width w and a length l, the length l being larger than the width w.

The diffractive features of the incoupling diffractive optical element run along the length of the diffractive optical element as shown by the lines running along the length of the illustrated element.

The illustrated lines are present to show the direction of the diffractive features in this example, but are not intended to represent particular form or characteristics of the diffractive features.

In the example of FIG. 6 the outcoupling diffractive optical element is located next to or adjacent the incoupling diffractive optical element.

In examples, the outcoupling diffractive optical element in FIG. 6 is an example of the first 18, and/or second 24, and/or third 36, and/or fourth 42 outcoupling diffractive optical elements.

The outcoupling diffractive optical element of FIG. 6 is generally rectangular in shape, having a width w and a length l, the width w being larger than the length l.

The diffractive features of the outcoupling diffractive optical element run along the length of the diffractive optical element as shown by the lines running along the length of the illustrated element.

Accordingly, in the example of FIG. 6 the direction of the diffractive optical features of the incoupling and outcoupling diffractive optical elements is substantially or generally the same.

In examples, the diffractive optical elements of FIG. 6 can be located on a rear surface of the substrate or on both front and rear surfaces.

Figure 7:
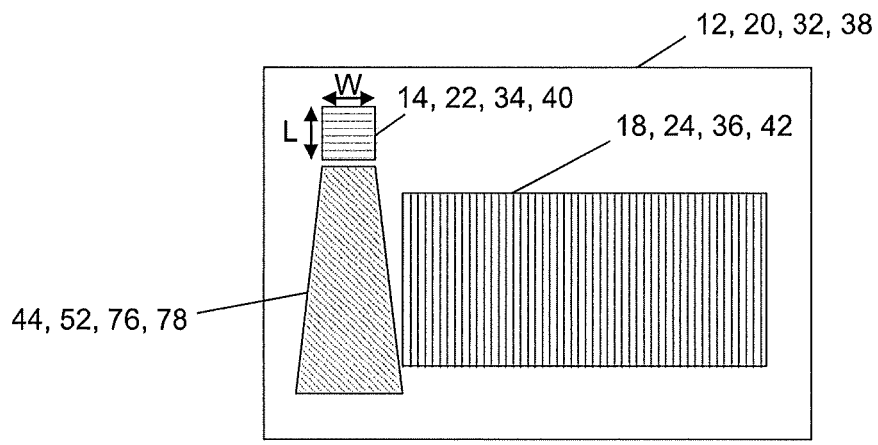
FIG. 7 shows another example of the subject matter described herein.

FIG. 7 illustrates an example of a substrate. In the example of FIG. 7 a front view of the substrate is shown.

FIG. 7 is similar to FIG. 6, and therefore can be as described in relation to FIG. 6.

However, in the example of FIG. 7 the incoupling diffractive optical element 14, 22, 34, 40 is substantially square in shape and the diffractive features run across the width of the incoupling diffractive optical element 14, 22, 34, 40.

Accordingly, in the example of FIG. 7, the diffractive features of the incoupling 14, 22, 34, 40 and outcoupling 18, 24, 36, 42 diffractive optical elements 18, 24, 36, 42 run in different, orthogonal directions.

Furthermore, in the example of FIG. 7, the substrate 12, 20, 32, 38 comprises an intermediate or expander diffractive optical element. Accordingly, FIG. 7 shows an example of a first substrate 12, comprising a first intermediate diffractive optical element 44, and/or a second substrate 20 comprising a second intermediate diffractive optical element 52, and/or a third substrate 32 comprising a third intermediate diffractive optical element 76 and/or a fourth substrate 38 comprising a fourth intermediate diffractive optical element 78.

In examples, the intermediate of expander grating 44, 52, 76, 78 is configured to expand in a first and/or second dimension an exit pupil of light 16 coupled into the substrate. In examples the first and second dimensions are different and, in some examples, are orthogonal.

In the example of FIG. 7, the intermediate diffractive optical element 44, 52, 76, 78 is trapezoidal in shape and the diffractive features of the intermediate diffractive optical element 44, 52, 76, 78 are angled with respect to the diffractive optical features of the incoupling 14, 22, 34, 40 and outcoupling 18, 24, 36, 42 diffractive optical elements.

However, in examples, the intermediate or expander diffractive optical element 44, 52, 76, 78 can have any suitable shape, size, form and/or characteristics and so on. For example, the discussion of diffractive optical elements in relation to FIG. 1 can apply to the intermediate or expander diffractive optical element(s) of the apparatus 10.

The illustrated lines are present to show the direction of the diffractive features in this example, but are not intended to represent particular form or characteristics of the diffractive features.

In FIG. 7 the intermediate expander diffractive optical element 44, 52, 76, 78 is located beneath the incoupling diffractive optical element 14, 22, 34, 40 on a face of the substrate 12, 20, 32, 38. The outcoupling diffractive optical element 18, 24, 36, 42 is located next to or adjacent the intermediate diffractive optical element (44, 52, 76, 78.

However, in examples, the diffractive optical elements can be arranged and/or configured in any suitable way.

In examples, the intermediate diffractive optical elements 44, 52, 76, 78 of two substrates in an apparatus 10 are substantially inverse or opposite of each other or one another.

In some examples, the intermediate diffractive optical elements 44, 52, 76, 78 of two substrates in an apparatus 10 can be considered to be inverse or opposite of each other or one another.

For example, in examples where the first and second substrates 12, 20 comprise intermediate diffractive optical elements 44, 52, the first and second diffractive optical elements 44, 52 can be substantially inverse or opposite of each other or one another.

Accordingly, in examples there is provided an apparatus 10 wherein the first substrate 12 comprises a first intermediate diffractive optical element 44 configured to expand in a first and/or second dimension an exit pupil of light 16 coupled into the first substrate 12; and wherein the second substrate 20 comprises a second intermediate diffractive optical element 52 configured to expand in the first and/or second dimension an exit pupil of light 16 coupled into the second substrate 20, wherein the first and second dimensions are different and wherein the first and second intermediate diffractive optical elements 44, 52 are substantially inverse of each other.

This applies equally to any substrates of the apparatus 10, such as the third and fourth substrates 32, 38 of FIG. 4.

Figure 8:
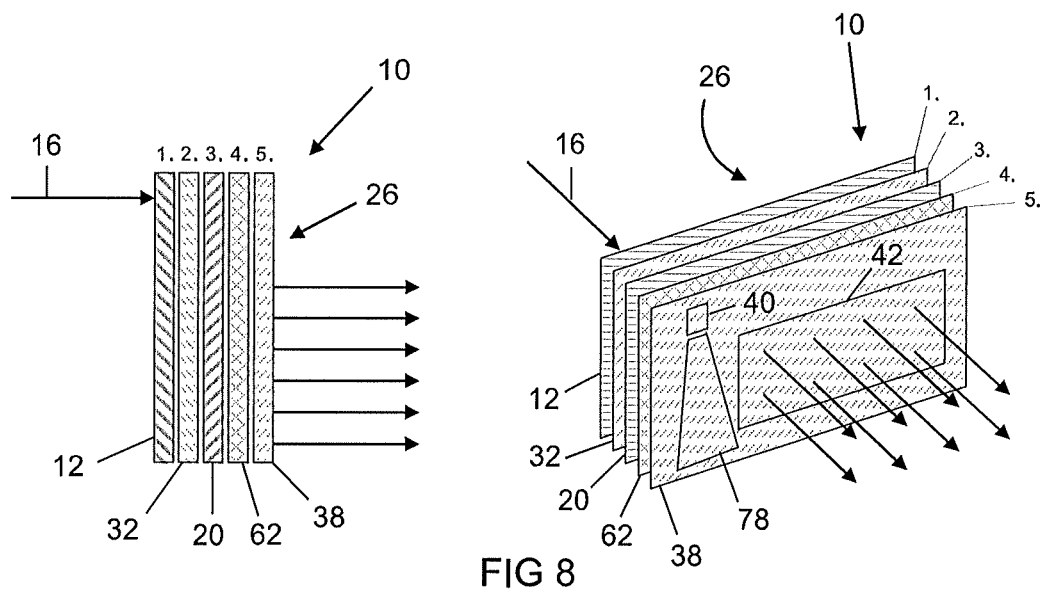
FIG. 8 shows another example of the subject matter described herein.

FIG. 8 illustrates an example of an apparatus 10. In examples, the apparatus 10 of FIG. 8 can be an apparatus 10 as described herein. Accordingly, one or more features of the apparatus 10 of FIG. 8 can be as described in relation to one or more of FIGS. 1 to 7.

In the example of FIG. 8, the apparatus comprises five substrates in a stack 26. The substrates are labelled one to five.

To the left of FIG. 8 a side view of the substrates one to five is shown. In the example of FIG. 1, the substrate labelled with a '1' can be considered the first substrate 12.

In this example, the corresponding substrate of the substantially inverse pair is labelled with a '3'. Accordingly, in this example, the substrate labelled '3' can be considered the second substrate 20 as described herein.

In FIG. 8, the substrate labelled with a '2' can be considered the third substrate 32 as described herein.

In this example, the corresponding substrate of the substantially inverse pair is labelled with a '5'. Accordingly, in this example, the substrate labelled '5' can be considered the fourth substrate 38 as described herein.

In the example of FIG. 8 there is a further substrate 62 labelled with a '4' having no corresponding substantially inverse pair.

Accordingly, as illustrated by the example of FIG. 8, numbering has been used with regard to the various substrates of the apparatus 10 for illustrative purposes and is not intended to imply a certain order of substrates in the apparatus 10.

For example, in FIG. 8 the substrates labelled '1' to '5' can be considered first to fifth substrates respectively.

Similarly, the apparatus 10 can comprise any suitable number of substrates, with associated diffractive optical elements, with or without corresponding substantially inverse pairs.

As can be seen in the example to the left of FIG. 8, light 16 enters the first substrate 12 in an upper portion, from the left, passes through the various substrates 12, 32, 20, 62, 38, and exits to the right.

The exit pupil of the light 16 is expanded as illustrated by the number of arrows entering and exiting the apparatus 10.

A perspective view of the apparatus 10 is shown to the right of the example of FIG. 8.

In the example of FIG. 8, the substrates 12, 32, 20, 62, 38 are configured with corresponding diffractive optical elements in alignment throughout the stack 26. However, only the diffractive optical elements 40, 78 and 42 of the fourth substrate 38 are visible in this view.

In the example of FIG. 8 the substrates comprise incoupling, intermediate and outcoupling diffractive optical elements.

As can be seen in the example to the right of FIG. 8, light 16 enters the first substrate 12 in the upper left corner (towards the incoupling diffractive optical elements), passes through the various substrates 12, 32, 20, 62, 38 and exits from the front face of the fourth substrate, labelled '5'.

The exit pupil of the light 16 is expanded as illustrated by the number of arrows entering and exiting the apparatus 10.

In examples the light 16 can come one or more light sources 56 such as one or more projection engines. See, for example, FIG. 9.

Figure 9:
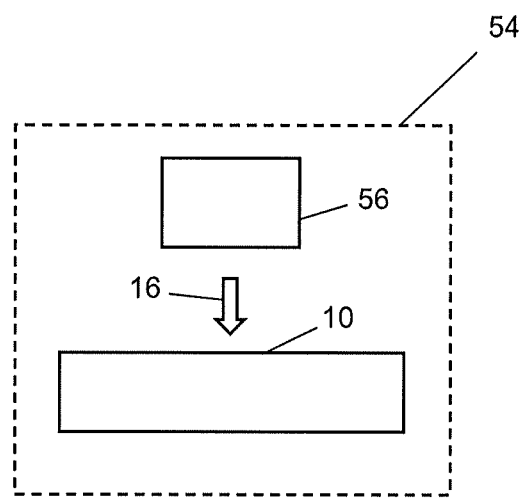
FIG. 9 shows another example of the subject matter described herein.

FIG. 9 illustrates an example of a system 54.

In the example of FIG. 9 the system 54 comprises a light source 56 and an apparatus 10 as described in relation to one or more of FIGS. 1 to 8 and/or as described herein.

In the example of FIG. 9, the light source is configured to provide light to at least the first incoupling diffractive optical element 14. In this example, the apparatus 10 is configured to expand the exit pupil of the light source 56.

Accordingly, FIG. 9 illustrates an example of a system 54 comprising an apparatus 10 as described herein, a light source 56 configured to provide light to at least the first incoupling diffractive optical element 14, wherein the apparatus 10 is configured to expand the exit pupil of the light source 56.

In examples any suitable light source 56 can be used. For example, the light source can comprise, be or be considered a projection engine and/or optical engine.

The light source 56 can, for example, comprise a display and one or more optical devices (for example, lenses). The display can, for example, be a micro-display that comprises pixels at more than fifty lines per millimetre. The one or more optical devices are for magnifying an image displayed on the display and/or collimating the light output of the system 54.

Figure 10:
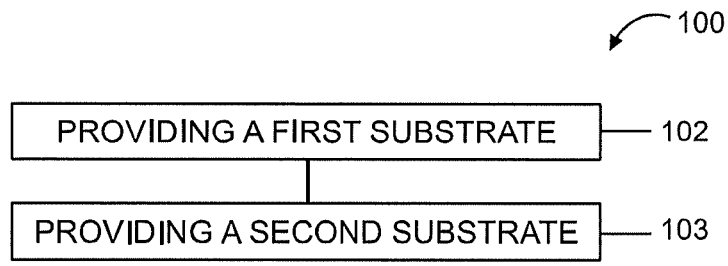
FIG. 10 shows another example of the subject matter described herein.

FIG. 10 illustrates an example of a method 100. The method 100 can be considered a method 100 of providing and/or producing and/or manufacturing and/or making an apparatus 10 as described herein.

At block 102 the method 100 comprises providing a first substrate comprising a first incoupling diffractive optical element configured to couple light into the first substrate, and a first outcoupling diffractive optical element configured to output, from the first substrate, light that has been coupled into the first substrate.

The first substrate, and associated diffractive optical elements, can be as described herein, for example, the first substrate 12, and associated diffractive optical elements, described in relation to FIG. 1.

Any suitable method for providing the first substrate, and associated diffractive optical elements, can be used. For example, providing the first substrate can comprise coating, lithography, etching, master moulding, ruling, and/or imprinting and so on.

In examples, providing the first substrate comprises using, directly or indirectly, a master mould. A master mould can be used to provide the first substrate in any suitable way.

For example, the first substrate can be made from the master mould itself, this can be considered direct usage of the master mould.

In some examples, the first substrate can be made from a child mould that has been made from the master mould. This can be considered indirect usage of the master mould.

In examples a child mould that has been made directly or indirectly from the master mould can be used to provide the first substrate.

At block 103 the method 100 comprises providing a second substrate comprising a second incoupling diffractive optical element configured to couple light into the second substrate, and a second outcoupling diffractive optical element configured to output, from the second substrate, light that has been coupled into the second substrate.

The second substrate, and associated diffractive optical elements, can be as described herein, for example, the second substrate 20, and associated diffractive optical elements, described in relation to FIG. 1.

Any suitable method for providing the second substrate, and associated diffractive optical elements, can be used. For example, providing the second substrate can comprise coating, lithography, etching, master moulding, ruling, and/or imprinting and so on.

In examples, providing the second substrate comprises using, directly or indirectly, a master mould. A master mould can be used to provide the second substrate in any suitable way.

For example, the second substrate can be made from the master mould itself, this can be considered direct usage of the master mould.

In some examples, the second substrate can be made from a child mould that has been made from the master mould. This can be considered indirect usage of the master mould.

In examples a child mould that has been made directly or indirectly from the master mould can be used to provide the second substrate.

In examples child moulds and substrates can be provided and/or manufactured, for example using nanoimprint lithography methods, where gratings of the master mould are cast/imprinted on the surface of blank wafers using, for example, UV curable polymer material.

The first substrate comprises a first incoupling diffractive optical element and a first outcoupling diffractive optical element and the second substrate comprises a second incoupling diffractive optical element and a second outcoupling diffractive optical element.

In examples, the first and second incoupling diffractive optical elements are substantially inverse of each other and the first and second outcoupling diffractive optical elements are substantially inverse of each other.

Accordingly, in examples, the first and second substrates can be considered an substantially inverse pair.

In some examples, the first and second incoupling diffractive optical elements can be considered inverse of each other and the first and second outcoupling diffractive optical elements can be considered inverse of each other.

FIG. 10 therefore illustrates a method 100 comprising:

providing a first substrate comprising a first incoupling diffractive optical element configured to couple light into the first substrate, and a first outcoupling diffractive optical element configured to output, from the first substrate, light that has been coupled into the first substrate; and providing a second substrate comprising a second incoupling diffractive optical element configured to couple light into the second substrate, and a second outcoupling diffractive optical element configured to output, from the second substrate, light that has been coupled into the second substrate;

wherein the first and second incoupling diffractive optical elements are substantially inverse of each other and the first and second outcoupling diffractive optical elements are substantially inverse of each other.

In examples, providing the first substrate comprises using, directly or indirectly, a master mould; and providing the second substrate comprises using, directly or indirectly, the master mould.

This is advantageous as it allows for the substrates to be provided from a single master mould, which provides cost and efficiency benefits.

It is also advantageous as the first and second substrates can be provided using child moulds, protecting the important and expensive master mould.

It is also noted that the substantially inverse/inverse diffractive features can be automatically provided by such production as the substantially inverse/inverse features will be provided by, for example, using a master mould for the first substrate and a child mould of the master mould for the second substrate.

In examples, the method 100 comprises providing any further substrates, and associated diffractive optical elements, of the apparatus similarly. For example, the third, fourth and/or fifth substrates described herein can be provided as described in relation to block 102 and/or 103 of method 100.

The illustration of a particular order to the blocks in FIG. 10 does not necessarily imply that there is a required or preferred order for the blocks and the order and arrangement of the blocks may be varied. Additionally, or alternatively, it may be possible for one or more blocks to be omitted.

Figure 11:
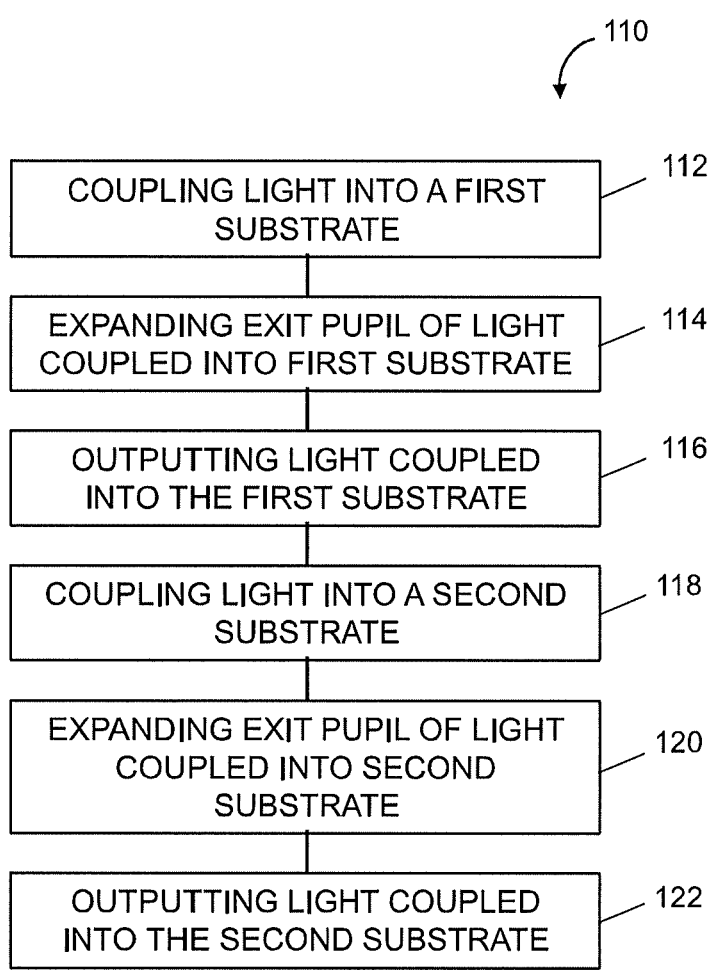
FIG. 11 shows another example of the subject matter described herein.

FIG. 11 illustrates an example of a method 110. The method 110 can be considered a method 110 of using an apparatus 10 as described herein.

At block 112, the method 110 comprises coupling light 16 into a first substrate 12.

At block 114, the method 110 comprises expanding an exit pupil of light 16 coupled into the first substrate 12.

At block 116, the method 110 comprises outputting light 16 coupled into the first substrate 12.

At block 118, the method 110 comprises coupling light 16 into a second substrate 20. In examples, outcoupled or output light 16 is not coupled into a further substrate.

At block 120, the method 110 comprises expanding an exit pupil of light 16 coupled into the second substrate 20.

At block 122, the method 110 comprises outputting light 16 coupled into the second substrate 20.

In examples, substantially the same or similar blocks can be included for further substrates of the apparatus 10, such as a third, fourth or fifth substrate described herein.

The illustration of a particular order to the blocks in FIG. 11 does not necessarily imply that there is a required or preferred order for the blocks and the order and arrangement of the blocks may be varied. Additionally, or alternatively, it may be possible for one or more blocks to be omitted.

Figure 12:
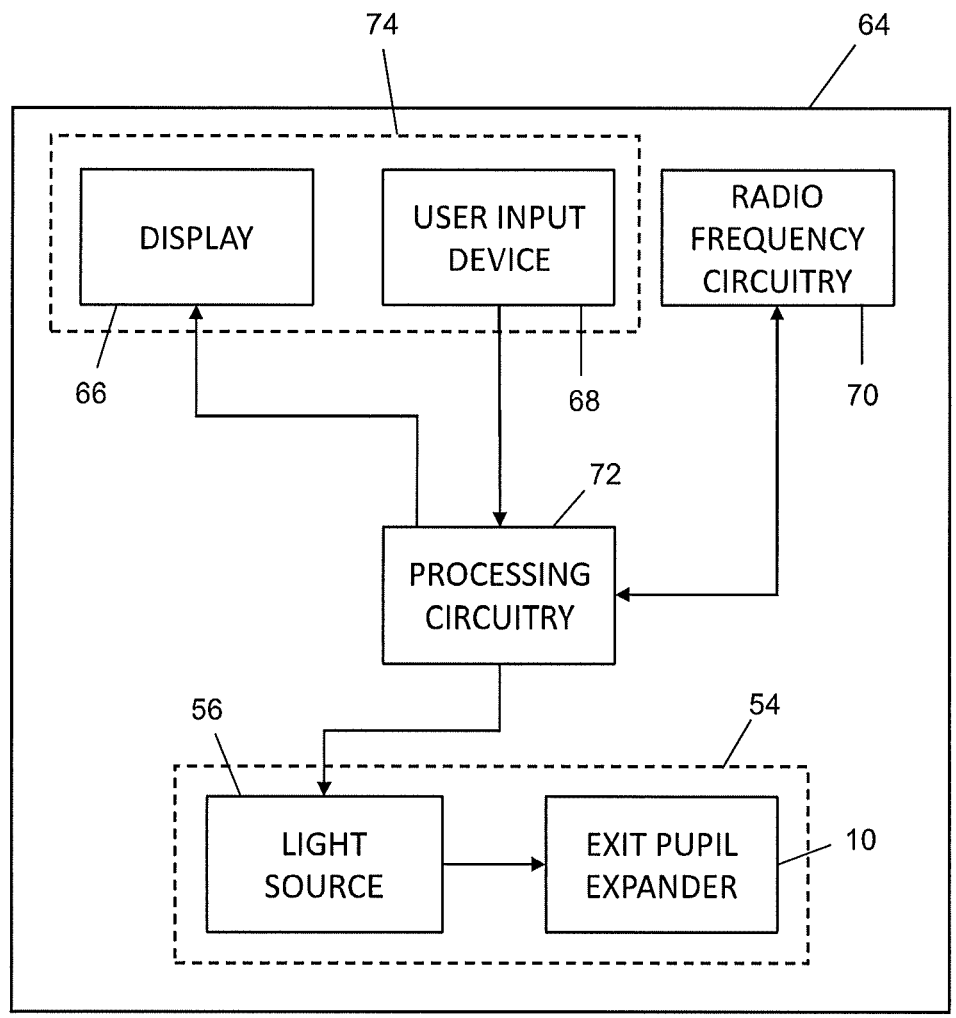
FIG. 12 shows another example of the subject matter described herein.

FIG. 12 schematically illustrates an example of an electronic device 64. The electronic device 64 can be any suitable electronic device 64, of any suitable size, shape and/or form.

In examples the electronic device 64 can be or comprise a hand portable device such as a mobile telephone, a personal music player, a personal digital assistant or a games console.

In examples, the electronic device 64 can be or comprise at least part of a vehicle, a heads up display, and augmented reality device, a virtual reality device and/or a machine.

In FIG. 12, the electronic device 64 is illustrated as comprising the system 54 illustrated in FIG. 9.

The electronic device 64 may further comprise processing circuitry 72, a display 66, a user input device 68 and radio frequency circuitry 70. The processing circuitry 72 may be configured to provide outputs to the light source 56, the display 66 and the radio frequency circuitry 70. The processing circuitry 72 may be configured to receive inputs from the user input device 68 and the radio frequency circuitry 70.

The display 66 and the user input device 68 may, for example, be integrated in a touch sensitive display 74.

FIG. 12 therefore illustrates an example of an electronic device 64 comprising a system 54 as described herein and at least one user input device 68.

In some examples, the system 54 can be and/or considered to be at least a part of any suitable system. For example, the system 54 can be a part of a Heads up Display (HUD), virtual reality (VR) system, such as VR glasses, augmented reality (AR) system, such as AR glasses, AR/VR system, such as AR/VR glasses, helmets with AR and/or VR and so on.

The system 54, for example as part of HUD, can also be a part of a ground vehicle, for example a car, motorcycle, bicycle, tractor, train, harvester and so on, an aerial vehicle, for example a helicopter, drone, airship, aeroplane and so on, a water vehicle, for example a boat, ship, hovercraft, ferry, submarine and so on, a space vehicle, for example space shuttle, space capsule and so on, and/or an autonomous vehicle, and/or a semi-autonomous vehicle and so on.

The system 54 can also form part of other moving and/or measurement devices and/or machines such as cranes, forklift, lift, scanners, x-ray machines, scales, measures and so on.

Although it has been described that corresponding diffractive optical elements of two substrates, for example first and second incoupling and outcoupling diffractive optical elements, are substantially inverse of each other, in examples not all of the diffractive optical elements of the substrates are substantially inverse of each other.

For example, the incoupling diffractive optical elements can be substantially inverse of each other or one another while the outcoupling diffractive optical elements are not substantially inverse of each other.

Accordingly, in examples there is provided an apparatus comprising:
 a first substrate comprising a first incoupling diffractive optical element configured to couple light into the first substrate, and a first outcoupling diffractive optical element configured to output, from the first substrate, light that has been coupled into the first substrate; and
 a second substrate comprising a second incoupling diffractive optical element configured to couple light into the second substrate, and a second outcoupling diffractive optical element configured to output, from the second substrate, light that has been coupled into the second substrate;
 wherein the first and second incoupling diffractive optical elements are substantially inverse of each other and/or the first and second outcoupling diffractive optical elements are substantially inverse of each other.

There is also provided an associated method of providing such an apparatus and an associated method of using such an apparatus.

In some examples, at least a pair of substrates of an apparatus 10 can be provided as described herein, directly or indirectly, using a master mould. However, in examples, the pair of substrates are not substantially inverse of each other or one another. This can be due to, for example, coating of intermediate moulds to affect fill ratio and/or depth of the grating and so on.

Accordingly, in such examples, although the substrates are not substantially inverse of one another they are derived from a single master mould.

Accordingly, in examples there is provided an apparatus comprising:
 a first substrate comprising a first incoupling diffractive optical element configured to couple light into the first substrate, and a first outcoupling diffractive optical element configured to output, from the first substrate, light that has been coupled into the first substrate; and a second substrate comprising a second incoupling diffractive optical element configured to couple light into the second substrate, and a second outcoupling diffractive optical element configured to output, from the second substrate, light that has been coupled into the second substrate;

wherein the first and second substrates are derived from a single master mould.

There is also provided an associated method of providing such an apparatus and an associated method of using such an apparatus.

Examples of the present disclosure provide technical benefits. For example, an apparatus 10 described herein provides improved efficiency. For example, at least part of the light wasted through the first incoupling diffractive optical element can be circulated in the second substrate 20.

Additionally, or alternatively, the second substrate 20, or exit pupil expander, can compensate for nonuniformities of the first substrate 14, or exit pupil expander, by having differently overlapping exit pupils and/or by balancing the expansion/outcoupling over the outcoupling diffractive optical elements differently.

Additionally, or alternatively tolerances in manufacture can be looser and/or the amount of modulated features (for example fill ratio) can be reduced while still achieving specified quality.

Additionally, or alternatively, in examples the diffractive optical elements are sealed in a stack, preventing damage to these sensitive components.

Additionally, or alternatively, the use of a single master mould in producing the first and second substrates can provide for efficient production with reduced costs.

The blocks illustrated in the FIGS. 10 and 11 may represent steps in a method. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
a first substrate comprising a first incoupling diffractive optical element configured to couple light into the first substrate, and a first outcoupling diffractive optical element configured to output, from the first substrate, light that has been coupled into the first substrate; and a second substrate comprising a second incoupling diffractive optical element configured to couple light into the second substrate, and a second outcoupling diffractive optical element configured to output, from the second substrate, light that has been coupled into the second substrate;

wherein the first and second incoupling diffractive optical elements are substantially inverse of each other and the first and second outcoupling diffractive optical elements are substantially inverse of each other;

wherein the second incoupling diffractive optical element is configured to couple into the second substrate light that has passed through the first incoupling diffractive optical element without being coupled into the first substrate.

2. An apparatus as claimed in claim 1, wherein the first and second substrates are stacked and at least a portion of the first and second substrates overlap.

3. An apparatus as claimed in claim 2, wherein the diffractive optical elements are sealed within the stack.

4. An apparatus as claimed in claim 2, comprising a third substrate, the third substrate comprising a third incoupling diffractive optical element configured to couple light into the third substrate, and a third outcoupling diffractive optical element configured to output, from the third substrate, light that has been coupled into the third substrate, wherein:

the third incoupling diffractive optical element is configured to couple into the third substrate light that has passed through the first incoupling diffractive optical element without being coupled into the first substrate; and the diffractive optical elements of the first and second substrates are configured to operate in a first spectral range and the diffractive optical elements of the third substrate are configured to operate in a second, at least partially different, spectral range.

5. An apparatus as claimed in claim 4, comprising a fourth substrate, the fourth substrate comprising a fourth incoupling diffractive optical element configured to couple light into the fourth substrate, and a fourth outcoupling diffractive optical element configured to output, from the fourth substrate, light that has been coupled into the fourth substrate, wherein:

the fourth incoupling diffractive optical element is configured to couple into the fourth substrate light that has passed through the first incoupling diffractive optical element without being coupled into the first substrate; and the third and fourth incoupling diffractive optical elements are substantially inverse of each other and the third and fourth outcoupling diffractive optical elements are substantially inverse of each other.

6. An apparatus as claimed in claim 4, wherein the first, second, third and fourth substrates are stacked and at least a portion of the first, second, third and fourth substrates overlap.

7. An apparatus as claimed in claim 1, comprising polarization rotator and/or wavelength dependent filter between the first and second incoupling diffractive optical elements.

8. An apparatus as claimed in claim 1, wherein the first substrate comprises a first intermediate diffractive optical element configured to expand in a first and/or second dimension an exit pupil of light coupled into the first substrate; and wherein the second substrate comprises a second intermediate diffractive optical element configured to expand in the first and/or second dimension an exit pupil of light coupled into the second substrate, wherein the first and second dimensions are different and wherein the first and second intermediate diffractive optical elements are substantially inverse of each other.

9. An apparatus as claimed in claim 1, wherein at least one of: substrate thickness, substrate shape, substrate materials, diffractive optical element materials, or coatings differ between the first and second substrate.

10. An apparatus as claimed in claim 1, wherein the outcoupling diffractive optical elements are configured to expand an exit pupil of light coupled into the respective substrates.

11. A system comprising an apparatus as claimed in claim 1, a light source configured to provide light to at least the first incoupling diffractive optical element, wherein the apparatus is configured to expand the exit pupil of the light source.

12. An electronic device comprising a system as claimed in claim 11, and at least one user input device.

13. A method comprising:

providing a first substrate comprising a first incoupling diffractive optical element configured to couple light into the first substrate, and a first outcoupling diffractive optical element configured to output, from the first substrate, light that has been coupled into the first substrate; and providing a second substrate comprising a second incoupling diffractive optical element configured to couple light into the second substrate, and a second outcoupling diffractive optical element configured to output, from the second substrate, light that has been coupled into the second substrate;

wherein the first and second incoupling diffractive optical elements are substantially inverse of each other and the first and second outcoupling diffractive optical elements are substantially inverse of each other;

wherein the second incoupling diffractive optical element is configured to couple into the second substrate light that has passed through the first incoupling diffractive optical element without being coupled into the first substrate.

14. A method as claimed in claim 13, wherein providing first substrate comprises using, directly or indirectly, a master mould; and wherein providing the second substrate comprises using, directly or indirectly, the master mould.

15. An apparatus comprising:

a first substrate comprising a first incoupling diffractive optical element configured to couple light into the first substrate, and a first outcoupling diffractive optical element configured to output, from the first substrate, light that has been coupled into the first substrate; and a second substrate comprising a second incoupling diffractive optical element configured to couple light into the second substrate, and a second outcoupling diffractive optical element configured to output, from the second substrate, light that has been coupled into the second substrate;

wherein the first and second incoupling diffractive optical elements are substantially inverse of each other and the first and second outcoupling diffractive optical elements are substantially inverse of each other;

wherein the first and second substrates are stacked and at least a portion of the first and second substrates overlap.

16. The apparatus of claim 15, wherein the diffractive optical elements are sealed within the stack.

17. The apparatus of claim 15, comprising a third substrate, the third substrate comprising a third incoupling diffractive optical element configured to couple light into the third substrate, and a third outcoupling diffractive optical element configured to output, from the third substrate, light that has been coupled into the third substrate, wherein:

the third incoupling diffractive optical element is configured to couple into the third substrate light that has passed through the first incoupling diffractive optical element without being coupled into the first substrate; and the diffractive optical elements of the first and second substrates are configured to operate in a first spectral range and the diffractive optical elements of the third substrate are configured to operate in a second, at least partially different, spectral range.

18. The apparatus of claim 17, comprising a fourth substrate, the fourth substrate comprising a fourth incoupling diffractive optical element configured to couple light into the fourth substrate, and a fourth outcoupling diffractive optical element configured to output, from the fourth substrate, light that has been coupled into the fourth substrate, wherein:

the fourth incoupling diffractive optical element is configured to couple into the fourth substrate light that has passed through the first incoupling diffractive optical element without being coupled into the first substrate; and the third and fourth incoupling diffractive optical elements are substantially inverse of each other and the third and fourth outcoupling diffractive optical elements are substantially inverse of each other.

19. The apparatus of claim 17, wherein the first, second, third and fourth substrates are stacked and at least a portion of the first, second, third and fourth substrates overlap.

* * * * *